United States Patent [19]

Ward, III et al.

[11] Patent Number: 5,397,809

[45] Date of Patent: Mar. 14, 1995

[54] POLYURETHANE FOAM OF LOW THERMAL CONDUCTIVITY AND METHOD OF PREPARATION

[75] Inventors: William J. Ward, III, Schenectady; James Day, Scotia; Monica A. Ferrero-Heredia, East Greenbush, all of N.Y.; Edward J. McInerney, Louisville, Ky.

[73] Assignee: General Electric Company, Schenectady, N.Y.

[21] Appl. No.: 283,371

[22] Filed: Aug. 1, 1994

Related U.S. Application Data

[62] Division of Ser. No. 37,841, Mar. 29, 1993.

[51] Int. Cl.$^6$ ............................................. C08J 9/08
[52] U.S. Cl. .................................. 521/125; 521/130; 521/131
[58] Field of Search ................... 521/125, 130, 131

[56] References Cited

U.S. PATENT DOCUMENTS

| | | | |
|---|---|---|---|
| 4,110,268 | 8/1978 | Longley et al. | 521/177 |
| 4,176,218 | 11/1979 | Demou et al. | 521/125 |
| 4,469,820 | 9/1984 | Dexheimer et al. | 521/125 |
| 4,686,240 | 8/1987 | Bailey, Jr. et al. | 521/125 |
| 4,882,363 | 11/1989 | Neuhaus et al. | 521/122 |
| 4,999,383 | 3/1991 | Blount | 521/125 |
| 5,110,834 | 5/1992 | Horn et al. | 521/125 |

FOREIGN PATENT DOCUMENTS

| | | |
|---|---|---|
| 63-3166 | 1/1988 | Japan . |
| 1121675 | 5/1989 | Japan . |

*Primary Examiner*—Morton Foelak
*Attorney, Agent, or Firm*—William H. Pittman

[57] ABSTRACT

Polyurethane foam of low thermal conductivity is prepared by employing carbon dioxide as a blowing agent, preferably in combination with a halogenated compound, typically a halocarbon or halohydrocarbon such as monofluorotrichloromethane or 1,1-dichloro-1-fluoroethane, and incorporating in the foam a carbon dioxide-reactive reagent. Sodium hydroxide and soda lime are illustrative carbon dioxide-reactive reagents. The carbon dioxide is preferably formed in situ by the reaction of water with the diisocyanate precursor of the polyurethane, and the carbon dioxide-reactive reagent is preferably introduced in admixture with a portion of the polyol precursor.

7 Claims, No Drawings

POLYURETHANE FOAM OF LOW THERMAL CONDUCTIVITY AND METHOD OF PREPARATION

This application is a division of application Ser. No. 08/037,841, filed Mar. 29, 1993.

This invention relates to insulating foams, and more particularly to polyurethane foams having unusually low thermal conductivity.

Insulating polyurethane foam is an indispensable constituent of many refrigerators and similar cooling units. By reason of increasingly strict Federal Government energy conservation standards, it is of interest to develop foams having substantially lower thermal conductivity than those presently available.

Conventional insulating polyurethane foam is generally prepared by the reaction of at least one polyol with at least one diisocyanate in the presence of suitable catalysts, surfactants and blowing agents. Among the blowing agents employed are halogenated compounds, which may be halocarbons such as monofluorotrichloromethane and/or halohydrocarbons such as 1,1-dichloro-1-fluoroethane. They remain in the cell voids of the foam after blowing, and their presence therein is beneficial since they have very low thermal conductivity and thus contribute to the insulating quality of the foam.

Also usually present in the reaction mixture is water, which serves at least three purposes. First, in small quantities it is effective to improve the flow properties of the mixture. Second, it reacts with a minor proportion of the diisocyanate to form carbon dioxide, which is also effective as a blowing agent. Third, it reacts to form substituted urea crosslinking moieties, thus stabilizing the foam as it is produced.

It is apparent, therefore, that the presence of water is advantageous for many purposes. Its presence is also disadvantageous, however, in that the carbon dioxide produced therefrom, which remains in the foam cell voids, has a high thermal conductivity. Thus, a foam prepared with the use of a blowing agent combination including 15% and 50% (by volume) carbon dioxide has a thermal conductivity approximately 5% and 15%, respectively, higher than a corresponding foam prepared without the use of carbon dioxide.

It would thus be of considerable interest to devise methods for producing insulating foam which employ carbon dioxide as a blowing agent, but which also produce a foam free from carbon dioxide or containing only very minor proportions thereof.

The present invention provides a method for producing polyurethane foam blown with carbon dioxide, and subsequently removing said carbon dioxide to decrease the thermal conductivity of the product. Said method can be adapted to in situ production of carbon dioxide, in conventional equipment used for the production of polyurethane foam. Also provided are polyurethane foams of unusually low thermal conductivity.

In one of its aspects, therefore, the invention is a method for preparing a polyurethane foam of low thermal conductivity which comprises foaming a polyurethane with a blowing agent comprising, at least in part, carbon dioxide, in the presence of a solid reagent which is incorporated in said foam and which is capable of removing said carbon dioxide.

The polyurethane-forming reagents employed according to the present invention are conventional and are well known in the art, and therefore do not require extended discussion herein. In general, said reagents include at least one polyol, typically a poly(oxyalkylene) polyol, and at least one diisocyanate such as toluene diisocyanate, employed in proportions effective to produce the desired polyurethane as a reaction product. Also typically present are catalysts such as amines and organotin compounds, as illustrated by dimethylcyclohexylamine and dibutyltin dilaurate; surfactants, typically silicone compounds; and blowing agents.

In general, the principal blowing agent is a halogenated compound. It may be at least one halocarbon, as illustrated by chlorofluorocarbons and especially monofluorotrichloromethane, and/or at least one halohydrocarbon, as illustrated by 1,1-dichloro-1-fluoroethane. It is usually present in the amount of about 15–25% by weight, based on total reactants, catalyst and surfactant. As previously noted, it remains in the cell voids of the foam and decreases its thermal conductivity, improving the insulating properties thereof.

An essential feature of the invention is the employment of carbon dioxide as at least part of the blowing agent. Said carbon dioxide is typically produced in situ by the reaction of diisocyanate with water added as a flow control agent. Most often, water is employed in an amount to provide carbon dioxide in the amount of about 1–60% and preferably about 2–50% by volume of total blowing agent.

Another essential feature of the invention is the employment of at least one solid reagent which is incorporated in said foam and which is capable of removing carbon dioxide. Said reagent is sometimes hereinafter designated "carbon dioxide-reactive reagent". However, it should be understood that it is not necessary that it react chemically with the carbon dioxide; it may also remove it by adsorption or a similar phenomenon. It is preferably added as a finely divided powder, although larger particles such as granules (maximum particle size up to about 2 mm.) may also be effective.

Over a period of time, the carbon dioxide-reactive reagent removes the carbon dioxide in the cell voids of the foam. Typical times required for removal are on the order of 1–2 months.

Suitable carbon dioxide-reactive reagents include molecular sieves and alkaline reagents. Alkaline reagents are often preferred. They include alkali metal and alkaline earth metal oxides and hydroxides, as exemplified by lithium hydroxide, sodium hydroxide, calcium oxide and hydroxide and barium oxide and hydroxide. Mixtures of these reagents may also be employed. An example is soda lime which is a mixture of calcium oxide with about 5–20% sodium hydroxide, said mixture generally also containing about 6–18% water.

It is sometimes found that certain carbon dioxide-reactive reagents, particularly lithium hydroxide and molecular sieves, become inactivated prior to or during polyurethane formation. In the case of molecular sieves, it is believed that this is a result of occlusion by one or more other foam-forming reagents. In the case of lithium hydroxide, it may be caused by similar occlusion or by blocking of the pores of the lithium hydroxide particles by lithium carbonate initially formed. Inactivation may be avoided by encapsulating the carbon dioxide-reactive reagent in a substantially inert encapsulating agent which is permeable to carbon dioxide. Suitable encapsulating agents, typically polymers, will be apparent to those skilled in the art.

The preferred carbon dioxide-reactive reagents are sodium hydroxide and soda lime, since they are particularly effective in the absence of encapsulation. Soda lime is particularly preferred by reason of its relatively low cost and effectiveness when introduced as a slurry in polyol, as described hereinafter.

The amount of carbon dioxide-reactive reagent employed is an amount effective to remove a substantial proportion, typically at least about 70%, of the carbon dioxide in the foam within the aforementioned period of about 1–2 months after foaming. The amount adequate for this purpose will vary according to the reagent employed, its particle size and other conditions, but can easily be determined by simple experimentation. When an alkaline reagent is employed, a molar ratio thereof to theoretical carbon dioxide in the range of about 1–3:1 should be employed.

In a typical foam-producing operation according to the present invention, diisocyanate is one reactive stream while polyol, halocarbon or halohydrocarbon, catalysts and surfactants and water form the other. The two streams may be mixed in a conventional foam-producing nozzle.

Carbon dioxide-reactive reagent is typically introduced in admixture with a portion of the polyol as a slurry, to facilitate metering. When soda lime is employed, this may be done using an injector employing pneumatic or hydraulic pressure or the like. The viscosity of the slurry of soda lime in the polyol should be high enough to prevent the soda lime from settling out during handling. Suitable viscosities may easily be determined by simple experimentation, and are typically achieved by maintaining a weight ratio of polyol to soda lime in the slurry in the range of about 0.5–2.0:1.

It will be apparent to those skilled in the art that other methods of blending the various constituents of the foam may be employed, particularly during development of a particular foam production procedure. For example, it may be desirable to incorporate a visual indicator in the slurry to monitor dispersion of the carbon dioxide-reactive reagent in the foam. Carbon black powder is a suitable indicator, and may be employed in the amount of about 1–5% by weight of the slurry.

The halocarbon or halohydrocarbon may be added in admixture with diisocyanate rather than polyol, and/or the carbon dioxide-reactive reagent may be slurried with a minor proportion of an inert liquid or introduced in some other fashion, provided it does not come into contact with the diisocyanate.

The product formed by the method of this invention is a polyurethane foam of low thermal conductivity having incorporated therein at least one of carbon dioxide-reactive reagents and reaction products of said reagents with carbon dioxide. Such foams are another aspect of the invention.

The invention is illustrated by a series of examples in which a masterbatch was prepared from 68.54 parts (by weight) poly(oxyalkylene) polyol blend, 1.37 parts of cyclohexyldimethylamine, 0.15 part of dibutyltin dilaurate, 0.34 part of a silicone surfactant and 0.6 part of water. The masterbatch was whipped for about 10 seconds to disperse air bubbles as nucleation sites. Sodium hydroxide or soda lime was added in various proportions and the masterbatch was then blended with a mixture of 82.9 parts of toluene diisocyanate and 29 parts of monofluorotrichloromethane. The resulting mixture was whipped and foamed in a mold.

It was found that a loading of 3 times the stoichiometric amount of sodium hydroxide granules (maximum size 2 mm.) resulted in removal of 100% of the carbon dioxide in 60 days. A loading of sodium hydroxide powder at 1.5 times the stoichiometric amount removed about 75% of the carbon dioxide in 40 days; the same was true of a loading of soda lime in the stoichiometric amount.

What is claimed is:

1. A polyurethane foam of low thermal conductivity having incorporated therein at least one of:
    solid alkaline reagents selected from the group consisting of sodium hydroxide and soda lime, and reaction products of said reagents with carbon dioxide.

2. A foam according to claim 1 which also comprises at least one halogenated compound.

3. A foam according to claim 2 wherein the halogenated compound is at least one halocarbon or halohydrocarbon.

4. A foam according to claim 3 wherein the halocarbon or halohydrocarbon is monofluorotrichloromethane or 1,1-dichloro-1-fluoroethane.

5. A foam according to claim 4 wherein said reagent is sodium hydroxide or soda lime.

6. A foam according to claim 5 wherein said reagent is sodium hydroxide.

7. A foam according to claim 5 wherein said reagent is soda lime.

* * * * *